US010921345B2

(12) United States Patent
Harasek et al.

(10) Patent No.: US 10,921,345 B2
(45) Date of Patent: Feb. 16, 2021

(54) METHOD FOR THE CONTACTLESS DETERMINING OF FLOW PARAMETERS USING LASER DOPPLER ANEMOMETRY AND RAMAN SPECTROSCOPY THROUGH A SAME OPTICAL LENS SYSTEM

(71) Applicant: TECHNISCHE UNIVERSITAET WIEN, Vienna (AT)

(72) Inventors: Michael Harasek, Vienna (AT); Bernhard Lendl, Vienna (AT); Christoph Gasser, Vienna (AT); Bahram Haddadi, Vienna (AT); Christian Jordan, Mistelbach (AT)

(73) Assignee: TECHNISCHE UNIVERSITAET WIEN, Vienna (AT)

( * ) Notice: Subject to any disclaimer, the term of this patent is extended or adjusted under 35 U.S.C. 154(b) by 0 days.

(21) Appl. No.: 16/606,726

(22) PCT Filed: Apr. 18, 2018

(86) PCT No.: PCT/EP2018/059946
§ 371 (c)(1),
(2) Date: Oct. 18, 2019

(87) PCT Pub. No.: WO2018/192996
PCT Pub. Date: Oct. 25, 2018

(65) Prior Publication Data
US 2020/0150045 A1    May 14, 2020

(30) Foreign Application Priority Data
Apr. 19, 2017   (AT) .................................... 161/2017

(51) Int. Cl.
*G01P 5/26*     (2006.01)
*G01J 3/44*     (2006.01)
(Continued)

(52) U.S. Cl.
CPC ....... *G01P 5/26* (2013.01); *G01J 3/44* (2013.01); *G01N 21/65* (2013.01); *G01N 21/85* (2013.01); *G01S 17/58* (2013.01)

(58) Field of Classification Search
CPC ........ G01N 211/65; G01N 3/44; G01N 21/85; G01N 5/26; G01S 17/58
See application file for complete search history.

(56) References Cited

U.S. PATENT DOCUMENTS 4,624,561 A * 11/1986 Exton ........................ G01P 5/26
                                                          356/28.5
8,077,294 B1    12/2011 Grund et al.
(Continued)

FOREIGN PATENT DOCUMENTS

AT            520087 B1       1/2019
JP          S58205827 A      11/1983

OTHER PUBLICATIONS

Lee, S. et al., "The Use of Turbulent Kinetic Energy in Free Mixing Studies," Proceedings of the AIAA Fluid and Plasma Dynamics Conference, Jun. 16, 1969, San Francisco, California, 10 pages.
(Continued)

*Primary Examiner* — Michael P LaPage
(74) *Attorney, Agent, or Firm* — McCoy Russell LLP

(57) ABSTRACT

The invention relates to a method for the contactless determining of the speed of a fluid flow and the concentration of at least one analyte therein, wherein a) the flow speed is measured by means of laser Doppler anemometry (LDA) using tracer particles which pass through an interference fringe pattern in the intersection region of two coherent monochromatic light beams and thereby generate a scattered light signal; and b) the concentration of the at least one analyte is measured by means of Raman spectroscopy, wherein a monochromatic light beam is radiated in and the Raman spectrum of the light inelastically scattered on the
(Continued)

analyte molecules in the flow is recorded; wherein c) a single light source is used for both the LDA and the Raman spectroscopy, such that both measurements are carried out in the intersection region of two two coherent light beams coming from the light source, wherein the speed is measured by photons elastically scattered onto the tracer particles, and the concentration is measured by photons inelastically scattered onto analyte molecules; and d) for the purposes of speed measurement, the elastically back-scattered photons are detected by the same lens optic that is also used for the radiation of the light beams.

9 Claims, 11 Drawing Sheets

(51) Int. Cl.
*G01N 21/65* (2006.01)
*G01N 21/85* (2006.01)
*G01S 17/58* (2006.01)

(56) References Cited

U.S. PATENT DOCUMENTS

| | | | | |
|---|---|---|---|---|
| 8,866,322 B2* | 10/2014 | Tchoryk, Jr. | ............ | G01S 17/95 290/44 |
| 2005/0190373 A1* | 9/2005 | Pepper | ............ | G01P 5/26 356/484 |
| 2008/0043219 A1* | 2/2008 | Bivolaru | ............ | G01P 5/26 356/28.5 |
| 2012/0038919 A1* | 2/2012 | Ikeda | ............ | G01J 3/0229 356/328 |
| 2012/0229792 A1* | 9/2012 | Fuglsang | ............ | G01P 5/26 356/28 |

OTHER PUBLICATIONS

Ragheb, M., "Computational Fluid Dynamics," mragheb Website, Available Online at https://mragheb.com/NPRE%20475%20Wind%20Power%20Systems/Computational%20Fluid%20Dynamics.pdf, Available as Early as Jan. 1976, 9 pages.
Drain, L., "The Laser Doppler Technique," Hoboken, New Jersey, John Wiley & Sons, Wiley-Interscience Publication, Oct. 1, 1980, 249 pages.
Goss, L. et al., "Combines CARS/LDA instrument for simultaneous temperature and velocity measurements," Experiments in Fluids, vol. 6, No. 3, Jan. 1988, 10 pages.
Durão, D. et al., "Measurements of turbulent and periodic flows around a square cross-section cylinder," Experiments in Fluids, vol. 6, No. 5, Jan. 1988, 7 pages.
Wilcox, D., "Turbulence Modeling for CFD," La Cañada, California, DCW Industries Inc., Jul. 1993, 477 pages.
Goldstein, R., "Fluid Mechanics Measurements," 2nd ed., Philadelphia, Pennsylvania, Taylor & Francis, Mar. 1, 1996, 121 pages.
Rastogi, P., "Photomechanics," Topics in Applied Physics, vol. 77, Available as Early as Jan. 2000, 485 pages.
Saarenrinne, P. et al., "Turbulent kinetic energy dissipation rate estimation from PIV velocity vector fields," Experiments in Fluids, vol. 29, Supp. 1, Dec. 2000, 8 pages.
Langtry, R. et al., "Transition Modeling for General CFD Applications in Aeronautics," Proceedings of the 43rd AIAA Aerospace Sciences Meeting and Exhibit, Jan. 10, 2005, Reno, Nevada, 14 pages.
Menter, F. et al., "A Correlation-Based Transition Model Using Local Variables—Part I: Model Formulation," Journal of Turbomachinery, vol. 128, No. 3, Jul. 2006, 10 pages.
Langtry, R. et al. "A Correlation-Based Transition Model Using Local Variables—Part II: Test Cases and Industrial Applications," Journal of Turbomachinery, vol. 128, No. 3, Jul. 2006, 12 pages.
Versteeg, H. et al., "An Introduction to Computational Fluid Dynamics," 2nd ed., Pearson, London, United Kingdom, Feb. 16, 2007, 517 pages.
Wendt, J., "Computational Fluid Dynamics: An Introduction," 3rd ed., Sint-Genesius-Rhode, Belgium, von Karman Institute, Available as Early as Jan. 2009, 332 pages.
Beushausen, V. et al., "2D-Measurement Technique for Simultaneous Quantitative Determination of Mixing Ratio and Velocity Field in Microfluidic Applications," Imaging Measurement Methods for Flow Analysis, NNFM 106, Jan. 2009, 10 pages.
Langtry, R. et al., "Correlation-Based Transition Modeling for Unstructured Parallelized Computational Fluid Dynamics Codes," AIAA Journal, vol. 47, No. 12, Dec. 2009, 13 pages.
Das, R. et al., "Raman spectroscopy: Recent advancements, techniques and applications," Vibrational Spectroscopy, vol. 57, No. 2, Nov. 2011, Available Online Aug. 17, 2011, 14 pages.
Rinke, G. et al., "In situ Raman imaging combined with computational fluid dynamics for measuring concentration profiles during mixing process," Chemical Engineering Journal, vol. 179, Jan. 1, 2012, 11 pages.
Wellhausen, M. et al., "Combined measurement of concentration distribution and velocity field of two components in a micromixing process," Microfluidics and Nanofluidics, vol. 12, No. 6, May 2012, 10 pages.
ISA European Patent Office, International Search Report Issued in Application No. PCT/EP2018/059946, dated Jun. 28, 2018, WIPO, 6 pages.

\* cited by examiner

METHOD FOR THE CONTACTLESS DETERMINING OF FLOW PARAMETERS USING LASER DOPPLER ANEMOMETRY AND RAMAN SPECTROSCOPY THROUGH A SAME OPTICAL LENS SYSTEM

CROSS-REFERENCE TO RELATED APPLICATIONS

The present application is a U.S. National Phase of International Patent Application Serial No. PCT/EP2018/059946 entitled "METHOD FOR THE CONTACTLESS DETERMINING OF FLOW PARAMETERS," filed on Apr. 18, 2018. International Patent Application Serial No. PCT/EP2018/059946 claims priority to Austrian Patent Application No. A 161/2017 filed on Apr. 19, 2017. The entire contents of each of the above-referenced applications are hereby incorporated by reference for all purposes.

TECHNICAL FIELD

The present invention pertains to a method for the contactless determination of multiple parameters of a liquid flow.

PRIOR ART

The characterization of process flows in chemical plants is very important for the industry. The online measurement of physical and chemical properties of flows such as speed, turbulence, chemical composition and concentration plays an essential role in the adjustment and optimization of industrial processes and systems. Different methods, which also include contactless techniques, are available for measuring these properties, wherein Raman spectroscopy is as of late primarily used for determining the composition and concentration of chemical compounds contained in a flow.

Raman spectroscopy is based on the Raman scattering of monochromatic light on molecules, wherein the monochromatic light used typically originates from a laser (R. S. Das, Y. K. Agrawal, "Raman spectroscopy: recent advancements, techniques and applications," Vibrational Spectroscopy 57.2 (2011): 163-176). Rinke et al. (Rinke, Gunter, et al., "In situ Raman imaging combined with computational fluid dynamics for measuring concentration profiles during mixing processes," Chem. Eng. 179 (2012): 338-348) describe the use of a pulsed Raman imaging method for determining the concentration of two components (water and ethanol) during the discharge from a macromixer. The authors also compared their results with data from flow simulations by means of "computational fluid dynamics" (CFD) in order to verify the suitability of Raman imaging for measuring concentration profiles. In this case, the attainable temporal resolution depends on the laser repetition frequency and the camera speed. When CFD is used in combination with RS, concentration profiles are generated from a plurality of detected Raman-scattered photons.

For example, the contactless methods described below are known for the actual measurement of the speed and the turbulent fluctuations.

Laser Doppler Velocimetry, LDV, or also Laser Doppler Anemometry, LDA, (the two terms are used interchangeably herein) is the speed determination of laser light reflected on particles based on the Doppler shift, i.e. at one point (and therefore by means of a single measurement), wherein "seeding (or tracer) particles," i.e. particles, on which Doppler scattering can take place without prior calibration, typically are purposefully added to this end.

LDV measures the average speed and the local instantaneous speed (fluctuations) of a flow with high accuracy by determining the speed of tracer particles that pass two collimated, monochromatic and coherent laser beams (L. E. Drain, "The laser Doppler techniques," Chichester, Sussex, England and New York, Wiley-Interscience, 250 p. 1 (1980)). In this case, two coherent laser beams are focused in a small volume such that they form a special "fringe" light pattern. This light is scattered by tracer particles in the flow that pass through this fringe zone consisting of brighter and darker light strips. The back-scattered light is collected in a receiver probe and detected by means of a photomultiplier. Since the spacing between bright and dark strips is known, the particle speed can be calculated from the frequency of the scattered light. The average flow speed and turbulence information (turbulence intensity, turbulent kinetic energy) of the flow can be calculated from the collected speed data by means of statistical methods (D. F. G. Durao, M. V. Heitor and J. C. F. Pereira, "Measurements of turbulent and periodic flows around a square cross-section cylinder," Experiments in Fluids 6.5 (1988): 298-304).

In Molecular Tagging Velocimetry, MTV, molecules are excited with light and thereby marked ("tagged"), wherein the fluorescent or phosphorescent light emitted by said molecules is detected, and wherein the speed is calculated from at least two measurements. Combinations of MTV and Raman spectroscopy are also known. For example, Beushausen et al. (Beushausen, Volker, et al., "2D-measurement technique for simultaneous quantitative determination of mixing ratio and velocity field in microfluidic applications," Imaging Measurement Methods for Flow Analysis, Springer Berlin Heidelberg, 155-164 (2009)) combined 2D Molecular Tagging Velocimetry ("2D MTV") with PSRS, i.e. "planar spontaneous Raman scattering," in order to analyze the speed and concentration field of water and ethanol in a micromixer. In addition, they compared their results with those of a conventional µPIV method.

In Particle Image Velocimetry, PIV, the movements of particles are optically tracked based on a plurality of snapshots and can be converted into vector fields and speed values. A combination of PIV and Raman spectroscopy is known, for example, from Wellhausen et al. (M. Wellhausen, G. Rinke and H. Wackerbarth, "Combined measurement of concentration distribution and velocity field of two components in a micromixing process," Microfluidics and Nanofluidics 12.6 (2012): 917-926), who analyzed the mixing behavior in a micromixer.

The disadvantages of these known combinations of a speed measurement by means of MTV or PIV and Raman scattering can be seen, among other things, in that a plurality of measurements are required for determining the speed and the composition or concentration, wherein said measurements furthermore take place at different locations of the flow and therefore do not allow any truly reliable conclusions, especially if the speed of the flow is high and the concentration of the analyte or analytes is low.

Due to the relatively low recording frequency of multiple images, a detection of high-frequency fluctuation movements is in conventional PIV systems only possible with significant effort, for example by using a recording frequency, which in accordance with the Nyquist-Shannon sampling theorem corresponds at least to twice the frequency of the maximum frequency to be monitored. The only options therefore consist of carrying out limited measurements of turbulence characteristics within the flow or carrying out measurements with significant image storage effort and post-processing effort. Furthermore, PIV measurements on the one hand require two optical access points to the flow to be monitored, namely one for the laser section and another one for the camera perpendicular thereto, and on the other hand a significantly higher concentration of seeding particles than LDV.

Based on these circumstances, the invention aims to make available an improved contactless method for determining the speed and concentration of flows.

DISCLOSURE OF THE INVENTION

According to the present invention, this objective is attained by making available a method for the contactless determination of the speed of a liquid flow, as well as the concentration of at least one analyte therein, wherein:
a) the flow speed is conventionally measured by means of laser Doppler anemometry, LDA, using tracer particles, which pass an interference strip pattern in the intersecting region of two coherent monochromatic light beams and thereby generate a scattered light signal, the frequency of which is proportional to the speed component of the flow extending perpendicular to the interference strips; and
b) the concentration of the at least one analyte is conventionally measured by means of Raman spectroscopy, in which a monochromatic light beam is irradiated and the Raman spectrum of the light inelastically scattered on analyte molecules in the flow is recorded, wherein the light intensity of frequencies, which only occur in the scattered light, is proportional to the concentration of the analyte molecules in the flow; wherein
c) a single light source is used for both the LDA and the Raman spectroscopy such that both measurements are carried out in the intersecting region of the two coherent light beams originating from the light source, and wherein the speed is measured by means of photons that are elastically scattered on the tracer particles and the concentration is measured by means of photons that are inelastically scattered on analyte molecules; and
d) the elastically back-scattered photons are detected by means of the same optical lens system, which is also used for the irradiation of the light beams, for the purpose of the speed measurement.

The present invention therefore not simply combines LDA and Raman spectroscopy into a single method, in which the speed values measured by means of LDA are set in relation to the concentration values determined by means of the Raman scattering, but rather it goes one step further in that i) a single light source is used for the speed measurement by means of LDV and the concentration measurement by means of Raman spectroscopy and ii) the elastically back-scattered photons are detected by means of the same optical lens system, which is also used for the irradiation of the light beams, for the purpose of the speed measurement. In this way, the flow speed and various turbulence parameters within the flow, as well as the concentration of one or more analytes therein, can be determined at a single location, wherein a single measurement furthermore would already suffice for this purpose.

The inventive combination of two generally known methods, which are innovatively combined into a single measuring method, therefore provides a synergy effect because the scattered light of the same laser beams is used for different purposes.

Due to the fact that the desired information with respect to the flow speed and the concentration of one or more defined analytes can already be obtained from a single measurement, it is possible to carry out a plurality of measurements within a short time in order to average the measurement results and to thereby increase the measuring accuracy or allow the detection of higher-frequency fluctuations.

Furthermore, the present invention reduces the instrumental expenditure because only a single laser source and a single optical lens system are required for the irradiation and the detection such that no separate lens(es) or optical waveguide(s) have to be provided for the detection of the photons elastically scattered on the tracer particles.

According to the present invention, however, it is particularly preferred to also collect the inelastically scattered photons by means of the same optical lens system such that no separate optical system has to be provided for the Raman spectroscopy. This allows an extremely compact design of a measuring arrangement suitable for carrying out the present invention in a single and easily transportable device. In addition, only a single optical access point to the flow is required in this case.

However, the inelastically scattered photons may alternatively or additionally also be detected by means of a separate optical lens system, which is positioned at a 90° angle to the irradiating direction as is routinely used in analyses of liquids, in order to minimize elastically scattered photons that reach the detector. The accuracy of the concentration measurement can be increased by using two optical lens systems for detecting the Raman-scattered light.

In another preferred embodiment, the light beams emitted from the light source into the flow are slightly frequency-shifted during the measurement by means of a Bragg cell in order to generate a moving interference pattern in the intersecting region, based on which interference pattern the flow direction is determined. Non-moving particles therefore deliver scattered light with the shift frequency whereas the frequency of moving particles is respectively added or subtracted depending on the flow direction. Since the shift frequency is known, the particle moving direction or flow direction can be more accurately determined thereof.

According to the present invention, it is furthermore preferred to use a polychromatic light source, the light of which is split into more than one pair of coherent light beams with different wavelengths, preferably into two or three beam pairs that are focused on the same point, in order to generate the interference pattern. This has the advantage that multiple speed and turbulence components, namely one each per beam pair, can be simultaneously measured for a single measuring point in order to describe the state of flow in greater detail.

In another preferred embodiment of the inventive method, the intersecting region of the light beams is spatially shifted between individual measurements by means of traversing unit, e.g. with a motor-driven mirror for the one-dimensional or two-dimensional positioning of the measuring point, such that measurements can be carried out at several different measuring points. This makes it possible to create a speed profile of the analyzed flow, which of course significantly increases the precision of the determined speed parameter.

In preferred embodiments of the invention, the lens of a CCD camera, at which the wavelengths isolated by means of a monochromator (e.g. a Czerny-Turner monochromator) preferably are deflected, is used as optical lens system, especially if a separate detection of the Raman-scattered light takes place, e.g., at a 90° angle to the irradiating direction. In this case, the CCD detector of the camera replaces the photomultiplier, which is otherwise used for the conversion of the signal into electrical signals and the amplification thereof.

It is particularly preferred that the CCD camera is connected to a spectrograph that generates the corresponding spectrum from the detected scattered light signal, wherein said spectrum is optionally forwarded to an iCCD camera. If this detector arrangement is (also) realized such that it can be spatially displaced by means of a traversing unit, 2D and 3D profiles, from which 2D and 3D concentration distributions can be calculated, can also be recorded for the inelastically scattered photons.

According to the present invention, it is furthermore preferred that the signals detected during LDA and Raman spectroscopy are synchronized in time in order to ensure that the speed information and concentration information originates from the same flow volume, which can otherwise lead to errors, especially in multiphase flows.

BRIEF DESCRIPTION OF THE DRAWINGS

The invention is described in greater detail below based on specific examples of preferred embodiments of the inventive method and with reference to the attached drawings, in which.

EXAMPLES

The invention is described in greater detail below with reference to preferred embodiments of the method. Although the present invention is exclusively described with reference to liquid flows, it is clear to a person skilled in the relevant art that the method according to the present invention can, in principle, also be applied to gas flows with only slight modifications.

Laser Doppler Anemometry, LDA

Figure 1:
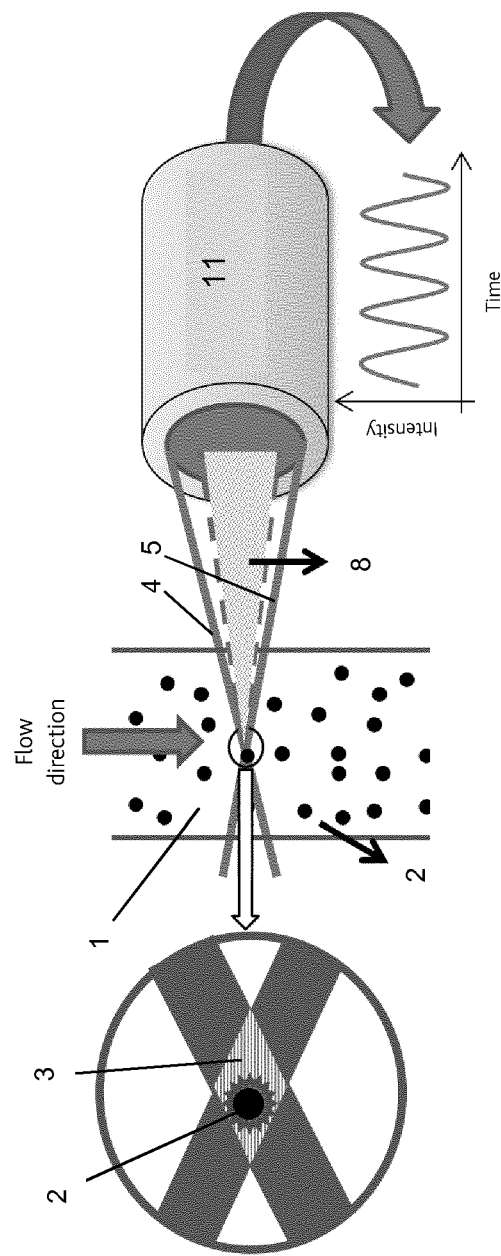
FIG. 1 shows the general basic structure for an LDV flow measurement according to the backscatter principle.

As already mentioned above, the present invention proposes to innovatively combine laser Doppler anemometry, LDA, or also laser Doppler velocimetry, LDV, and Raman spectroscopy with one another. FIG. 1 generally shows the basic structure for an LDA flow measurement according to the backscatter principle. In this case, two coherent laser beams 4, 5 originating from a laser light source 11 are focused in a small volume, where they intersect one another and form a special fringe (strip) light pattern in the intersecting region 3 as illustrated in the schematic enlargement in the left portion of FIG. 1. Tracer particles 2 carried along in the flow 1 to be analyzed pass this pattern consisting of brighter and darker light strips, wherein this light is scattered on the surface of the tracer particles under the influence of the Doppler effect. In this case, the "back-scattered" light 8 is detected so that the scattered light 8 can be received by means of the same optical lens system, which is also used for the emission of the laser beams 4 and 5, wherein this makes it possible to carry out the method with only one optical access point to the flow. The particle speed can be calculated from the frequency of the scattered light 8 and the known spacing between bright and dark strips.

Due to the small size and the low concentration of the tracer particles, it can be assumed that they follow the flow 1 and have no effect on the flow pattern (P. K. Rastogi, Ed., "Photomechanics," Vol. 77, Springer Science & Business Media (2003); Richard Goldstein, "Fluid mechanics measurements," CRC Press (1996)).

$$v = d \times f \quad (1)$$

In equation 1, v represents the particle (or flow) speed and d and f represent the spacing between the strips in the interference pattern ("fringe spacing") and the frequency of the scattered light 8 respectively.

Raman Spectroscopy

Figure 2:
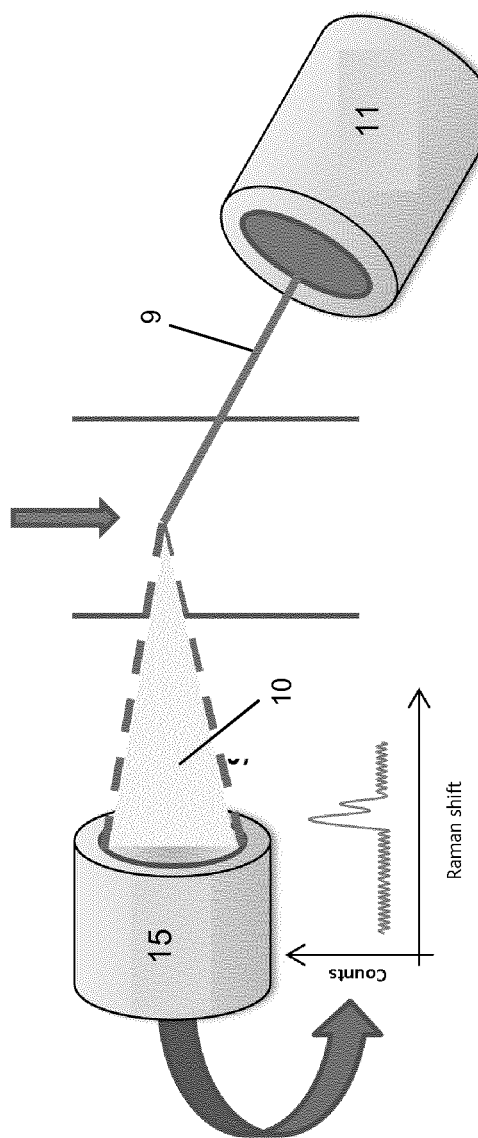
FIG. 2 generally outlines the instrumental structure of Raman spectroscopy.

FIG. 2 schematically shows the instrumental structure for Raman spectroscopy. In this case, a light beam 9 originating from a laser 11 usually is focused on the sample, wherein the scattered light 10 is collected by means of a telescope 15 and analyzed by means of a spectrograph. In the process, photons interact with the molecules in the sample, wherein they either release energy to the matter (Stokes shift) or absorb energy (Anti-Stokes shift) and the energy shift of the scattered photons 10 is specific and characteristic for a certain molecule. In this case, the Raman shift is calculated in accordance with the following equation:

$$\Delta w = \left( \frac{1}{\lambda_0} - \frac{1}{\lambda_1} \right) \quad (2)$$

wherein $\Delta w$ represents the Raman shift and $\lambda_0$ and $\lambda_1$ respectively represent the wavelength of the laser photons 5 and the wavelength of the scattered photons 10.

Computational Fluid Dynamics, CFD

The results obtained with the embodiments of the invention described in detail below were reconciled with those of computer simulations by means of computational fluid dynamics, which is the term used for the numerical analysis in fluid mechanics (M. Ragheb, "Computational fluid dynamics" (1976)). This method makes it possible to gain detailed inside into fluid-dynamic systems, which normally are only accessible with great difficulty or not accessible at all. Analyses can be applied to various orders of magnitude such as, for example, micromixers or entire industrial plants. In this case, the CFD is generally verified by means of experiments. Subsequently, various changes to the system can be simulated on a computer based on the validated models in order to thereby find optimized modifications (J. D. Anderson and J. Wendt, Computational fluid dynamics, Vol. 206, New York, McGraw-Hill (1995); H. K. Versteeg and M. Weeratunge, "An introduction to computational fluid dynamics: the finite volume method," Pearson Education (2007)).

CFD is based on the solution of the continuity equation and the Navier-Stokes equation for calculating the pressure and flow speed in a finite volume approach.

$$\frac{\partial \rho}{\partial t} + \nabla.(\rho u) = 0 \tag{3}$$

$$\frac{\partial u}{\partial t} + (u.\nabla)u = -\frac{1}{\rho}\nabla p + \frac{\mu}{\rho}\nabla^2 u \tag{4}$$

The energy conservation and energy transport are modeled by means of the energy equation.

$$\rho\left(\frac{\partial h}{\partial t} + \nabla.(hu)\right) = -\frac{Dp}{Dt} + \nabla.(K\nabla T) + (\bar{\tau}.\nabla)u \tag{5}$$

Method of the Present Invention

Figure 3:
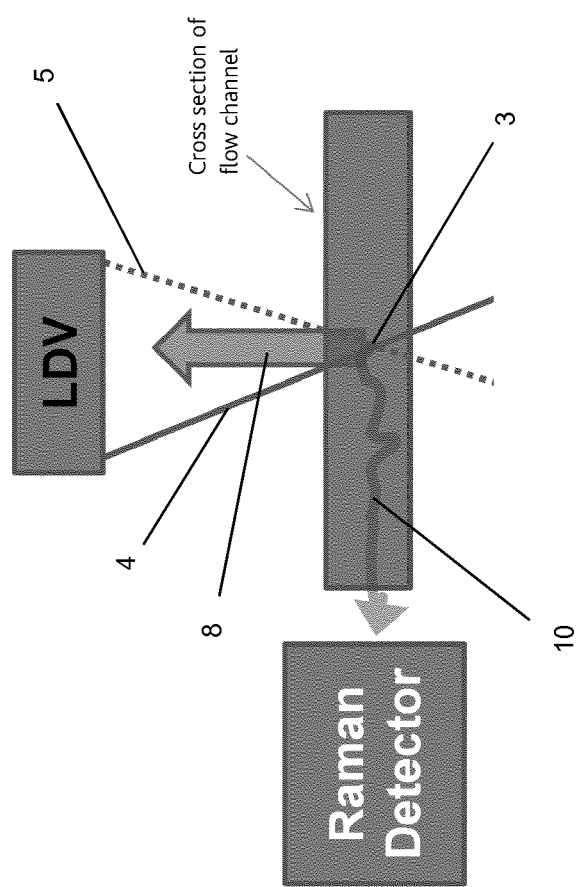
FIG. 3 shows a simple outline of the inventive method in the form of a combination of Raman spectroscopy and LDV.

FIG. 3 schematically shows an outline of the general approach of the present invention. A flow through a channel is simultaneously analyzed with respect to its flow speed by means of LDV and with respect to its composition by means of Raman spectroscopy in that two light beams 4, 5 are emitted from a common light source, wherein said light beams replace the light beam 9 emitted for the Raman spectroscopy because their wavelength is likewise adapted to the nature of the analyte or analytes, the concentration of which in the flow has to be determined. This wavelength usually lies in the visible or near-infrared range. The interference pattern, during the passage of which elastic scattering of the photons on tracer particles takes place, is on the one hand generated in the intersecting region 3 of the two laser beams, but analyte molecules dissolved in the flow simultaneously interact with the radiation such that photons are inelastically scattered. According to the present invention, the light 8 back-scattered by the tracer particles is detected by means of the same optical lens system, which is also used for the irradiation of the light beams 4 and 5 and identified by LDV in FIG. 3, for the purpose of the speed measurement by means of LDV. In contrast, the light 10 inelastically scattered on the analyte molecules is detected by means of a Raman detector, which preferably is arranged at an angle of 90° to the irradiating direction. However, this detection may alternatively or additionally to this separate Raman detector also be realized with the same optical lens system, which is also used for the irradiation, wherein this allows an extremely compact design with only one optical access point to the flow to be measured in the first case and increases the accuracy of the concentration measurement in the second case.

Figure 4:
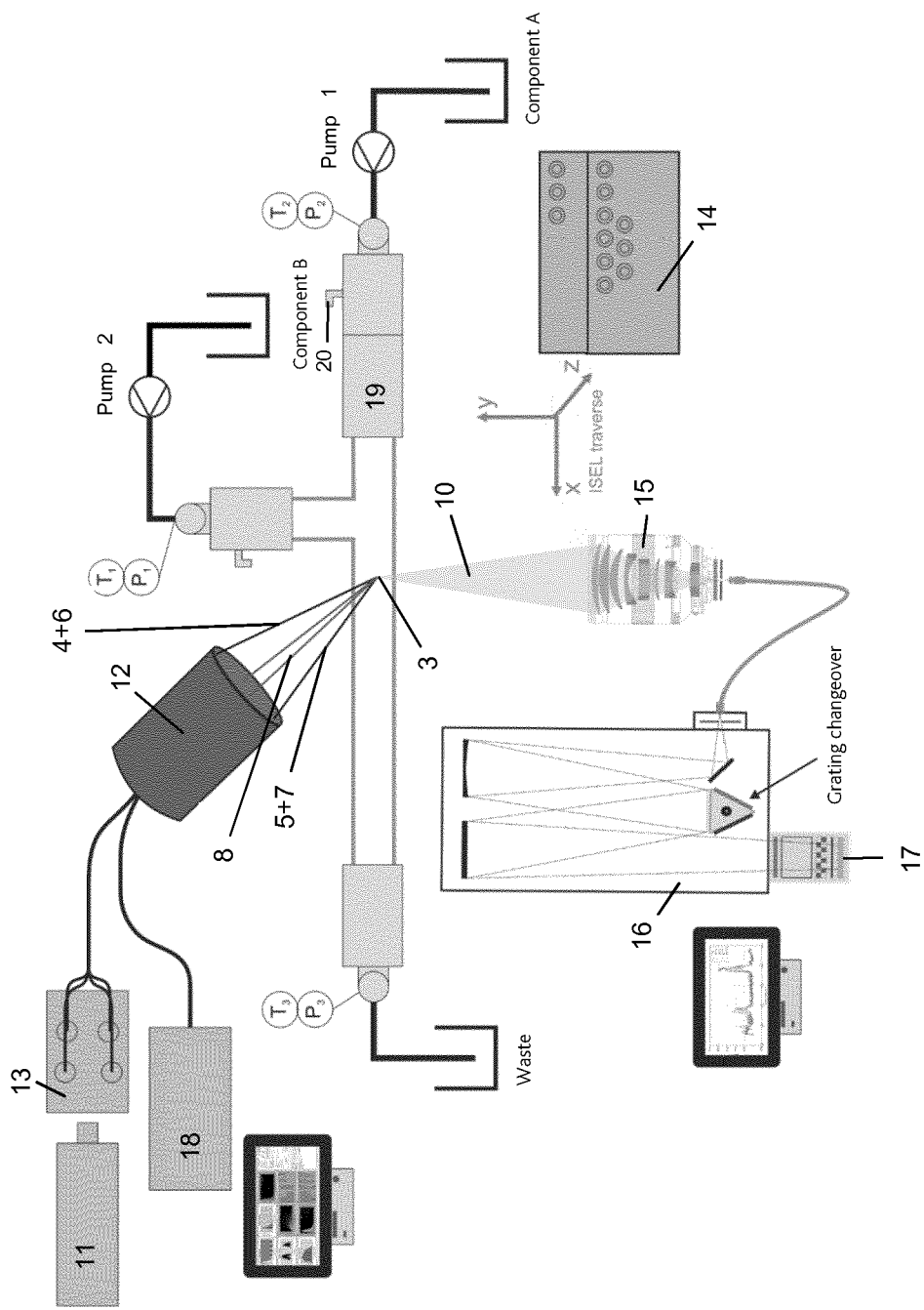
FIG. 4 schematically shows the instrumental structure for carrying out the inventive method.

FIG. 4 schematically shows the measurement structure for carrying out the inventive method based on a flow consisting of a mixture of water and ethanol (cf. Rinke et al., see above). The core of the structure is formed by a T-shaped flow channel of glass and aluminum, which is illustrated in an enlarged manner in the following FIGS. 5 and 6 and comprises inlets for the components A (water) and B (91% alcohol) via respective pumps 1 and 2, an inlet 20 for tracer particles, a downstream flow straightener 19, an outlet leading into a collection container for liquid waste and respective temperature and pressure sensors ($T_i$, $P_i$).

A laser beam emitted by a laser light source 11 is controlled with respect to its frequency by means of a Bragg cell 13 and split into two beam pairs of different frequency, i.e. into a total of four beams 4, 5, 6, 7, which are fed to focusing optics 12 via respective optical waveguides, wherein said focusing optics focus the four beams 4+6 and 5+7 on a point within the flow channel such that an interference pattern is generated in the intersecting region 3 of the beams. The use of four beams instead of only two beams has the advantage that two speed components can be simultaneously measured and the signal quality during the evaluation can be enhanced with coincidence methods.

The photons elastically scattered in the intersecting region are collected in the form of scattered light 8 by the same optical system 12 and fed to a combined photomultiplier and signal processor 18 for the purpose of signal amplification and signal processing. In contrast, the inelastically scattered photons are in the embodiment shown collected in the form of scattered light 10 by a CCD camera 15, which is positioned at a 90° angle to the irradiating direction and converts the optical signals into electrical signals that are subsequently fed to a spectrograph 16, wherein said spectrograph resolves the signals of different intensity into their spectrum that is ultimately amplified and stored by an iCCD camera 17. The entire structure can be spatially shifted by means of a traversing unit 14 in order to carry out measurements at several different measuring points, wherein this made it possible to respectively record speed profiles of the flow, as well as 2D and 3D Raman spectrums and concentration profiles of the analyte.

The entire structure specifically consisted of the following components:

PDPA system by TSI Inc., 2-component Phase Doppler Particle Analyzer laser;

CVI Melles-Griot, air-cooled argon-ion laser (nominal 300 mW);

Beam splitter: TSI Inc., fiber-coupled wavelength separator with Bragg cell (488 nm blue, 514.5 nm green);

Laser transceiver probe: TSI Inc., TR260 (focal length 350 mm, diameter 61 mm), fiber-coupled probe for 180° detection; probed length at focal point 0.91 mm, fringe spacing 3.6 µm;

Detector: TSI Inc. PDM 1000 photomultiplier system;

Signal processor: TSI FSA 4000 3-channel digital burst processor (sampling frequency 800 MHz, maximum Doppler frequency 175 MHz);

Software: FlowSizer (TSI Inc.)

Sigma 33-88 mm camera lens with 150 µm pinhole (Sigma);

"round to slit" fiber bundle for coupling the light into the spectrograph (Avantes);

Spectrograph (PI Acton 2750);

iCCD camera (PI-MAX, 1024×268 pixels);

ISEL XYZ traversing unit.

Material and Implementation

Different liquids were tested in order to determine suitable material for the LDV/Raman measurements. Water (tap water) and ethanol (91.12% ethanol+8.88% water) were ultimately selected for the following reasons:

non-toxic easy availability suitable Raman spectrum (both liquids can be clearly identified; sufficient intensity)

similar physical properties.

Figure 5:
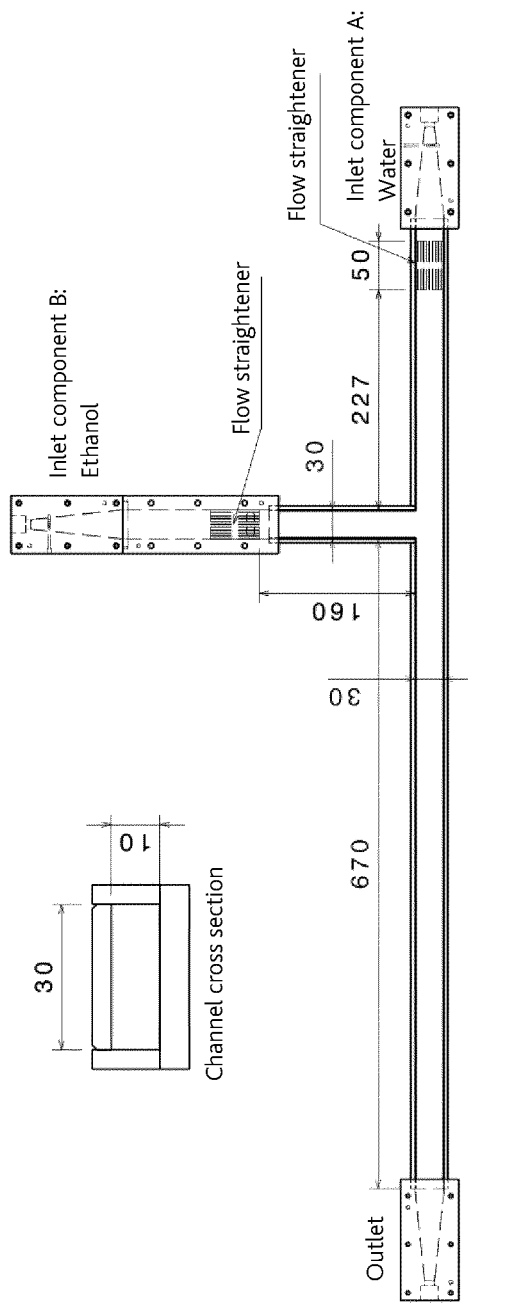
FIG. 5 shows a layout of the T-shaped flow channel used in the method.

FIG. 5 shows an enlarged view of the T-shaped flow channel. Water was pumped into the channel through the straight inlet "Inlet component A" and ethanol was pumped into the channel through the lateral inlet "Inlet component B." A gravimetric method was used for determining the mass flows of the two liquids, wherein the weight of the liquid tanks was measured by means of a scale and recorded. Flow straighteners were installed on both inlets in order to reduce inlet effects on the flow and to ensure a homogenous flow in the channel. The cross section of the channel amounted to 10×30 mm.

The LDV measurement time per measuring point was adjusted to 10 s or 10,000 valid particle signals (counts) whereas the composition was measured by means of Raman every second. Spherical aluminum particles (diameter<0.045 mm, Stokes number<1) were used as tracer particles for the LDV measurement, wherein the concentration in both flows amounted to ~100 ppm. The input and dispersion of the particles was realized by adding the particles into the liquid tanks.

LDV measurement data was obtained with the following signal processor adjustments:
burst threshold: 50 mV
bandpass filter: 1-10 MHz
downmix frequency: 35 MHz.

Figure 6:
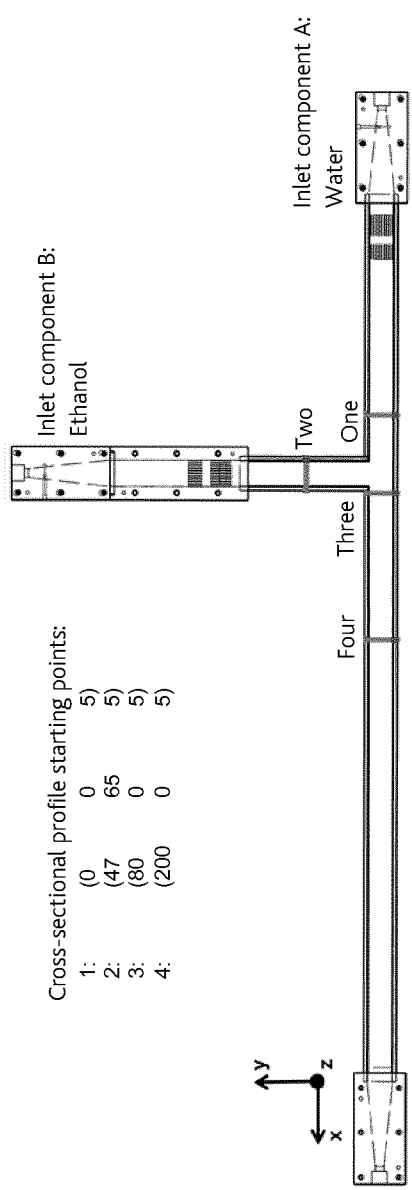
FIG. 6 shows the arrangement of the measuring positions in the T-shaped flow channel.

The measurement of the two speed components took place at four locations of the channel as illustrated in FIG. 6. Since only pure components are present at the inlets, only an LDA measurement was carried out at 11 points in profile 1 and 2. In contrast, LDA and Raman measurements were carried out at 16 points in the mixed zone in profile 3 and 4. All measurements were carried out in the center of the channel in the Z-direction at 298 K and under ambient pressure ($10^5$ Pa).

In order to verify the measurement results, a CFD simulation of the experiment was carried out with the open-source program OpenFOAM® [www.openfoam.com]. A new solver (viscoFoam) for the simulation of mixing flows was developed based on the OpenFOAM® platform. The boundary conditions for the simulation were selected in accordance with the experimental conditions (inlet temperature, ambient pressure, mass flow). Since the Reynolds number in the channel was in the range of the critical Reynolds number (water inlet: ~3700, EtOH inlet 2: ~1700, after mixing: ~5000), the transition turbulence model by Menter et al. was used (F. R. Menter et al., "A correlation-based transition model using local variables, part I: model formulation," Journal of Turbomachinery 128.3 (2006): 413-422; R. B. Langtry et al., "A correlation-based transition model using local variables, part II: test cases and industrial applications," Journal of Turbomachinery 128.3 (2006): 423-434; R. B. Langtry and F. R. Menter, "Correlation-based transition modeling for unstructured parallelized computational fluid dynamics codes," AIAA Journal 47.12 (2009): 2894-2906; R. B. Langtry and F. R. Menter, "Transition modeling for general CFD applications in aeronautics," $43^{rd}$ AIAA Aerospace Sciences Meeting and Exhibit, 2005).

Data Evaluation

Figure 7:
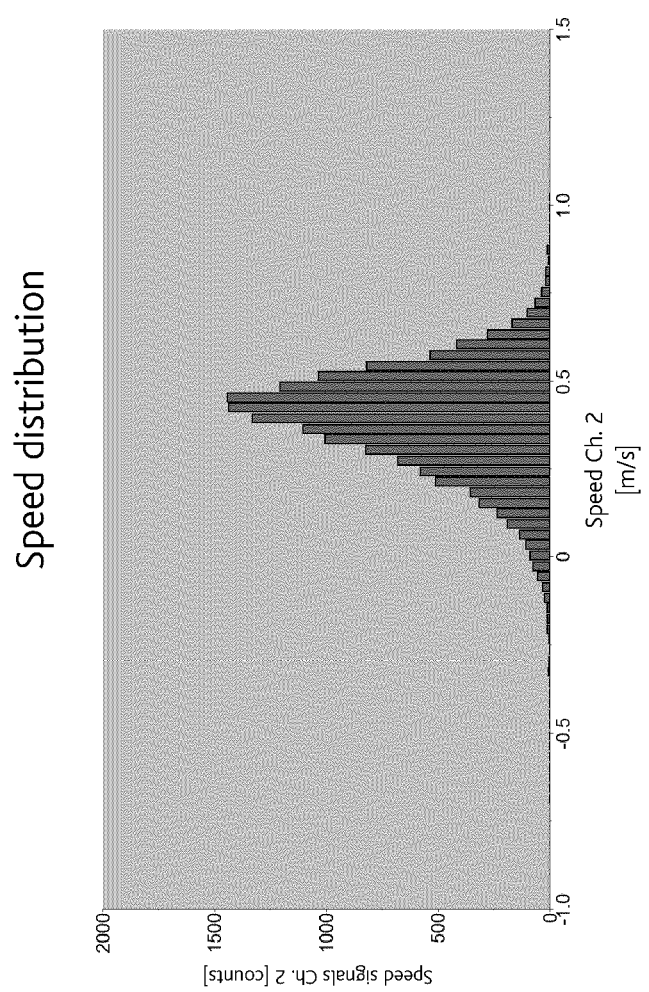
FIG. 7 shows the distribution of the measured speed values for a measuring point.

FIG. 7 shows an excerpt of the data obtained by means of the LDA measurement (tenth measuring point of profile 3, speed component in the x-direction). The average speed, as well as the turbulent kinetic energy, was calculated from this data for each measuring point and illustrated.

The turbulent kinetic energy is defined as the average kinetic energy of the turbulent fluctuations (local speed fluctuations, vortices) referred to the mass of the fluid (D. C. Wilcox, "Turbulence modeling for CFD," Vol. 2, La Canada, CA: DCW Industries (1998); P. T. Harsha and S. C. Lee, "Use of turbulent kinetic energy in free mixing studies," AIAA Journal 8.6 (1970): 1026-1032). The turbulent kinetic energy for a two-dimensional flow can be calculated as follows (P. Saarenrinne and M. Piirto, "Turbulent kinetic energy dissipation rate estimation from PIV velocity vector fields," Experiments in Fluids, 29 (2000): p. 300-p. 307):

$$k = \tfrac{1}{2}(\overline{(u')^2} + \overline{(v')^2}) \tag{6}$$

wherein k represents the turbulent kinetic energy, u' represents the speed fluctuations in the first direction and v' represents the speed fluctuations in the second direction.

Figure 8:
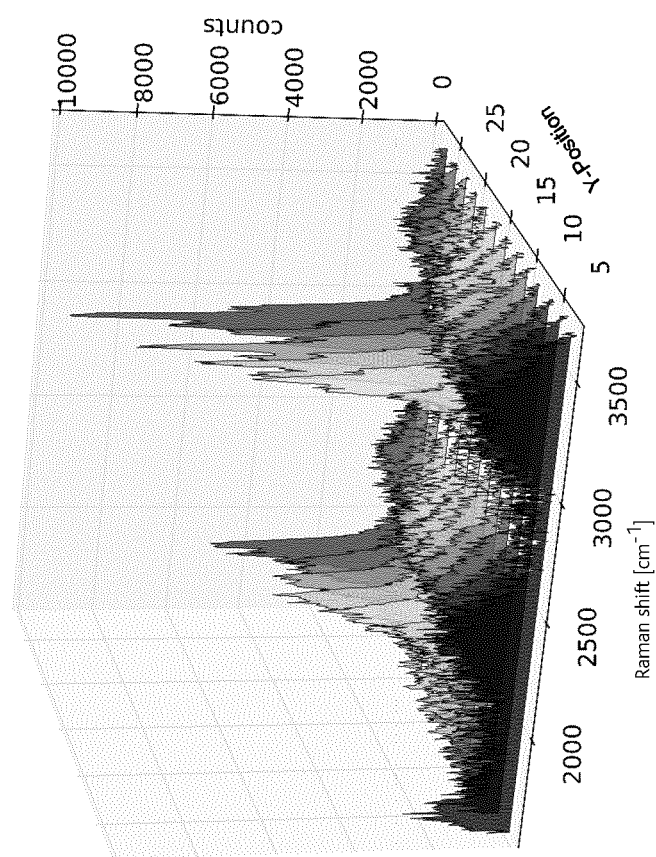
FIG. 8 shows the time-averaged data of the Raman measurement at different locations.

FIG. 8 shows the time-averaged data of the Raman spectroscopy of profile 3 (see FIG. 6). The data was evaluated with the aid of a calibration curve and the concentrations of water and ethanol were calculated for each point and illustrated. 10 Raman measurements were carried out per measuring point, wherein each measurement required 1 s.

Figure 9:
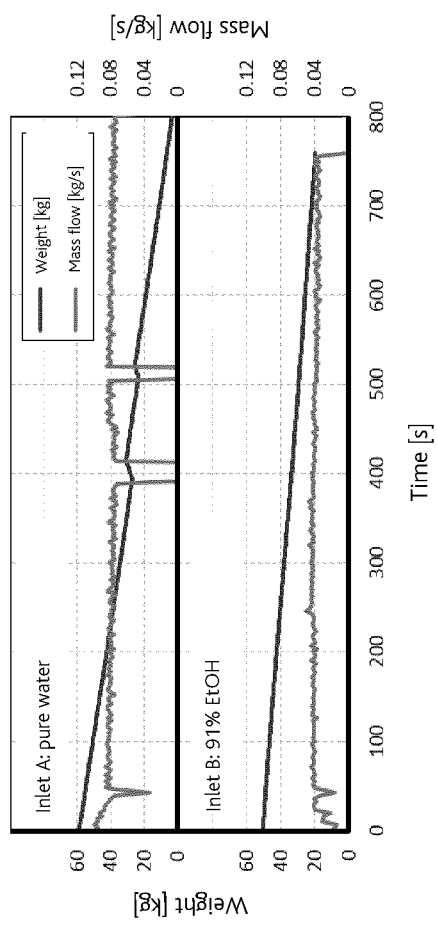
FIG. 9 shows the filling level of the liquid tanks used and the mass flows as a function of the time.

The mass of the liquid tanks was recorded during the experiment and the mass flows were determined thereof. According to FIG. 9, the average mass flow for water (component A) lies at ~0.08 kg/s and for ethanol (component B) at ~0.04 kg/s. The discontinuities at the water inlet can be explained in that the water tank was refilled twice during the experiment.

Results and Discussion

LDA Measurements

The results of the LDA measurements of all profiles were evaluated and illustrated. The comparison with the CFD simulation shows that the results correspond well to the prediction.

Figure 10:
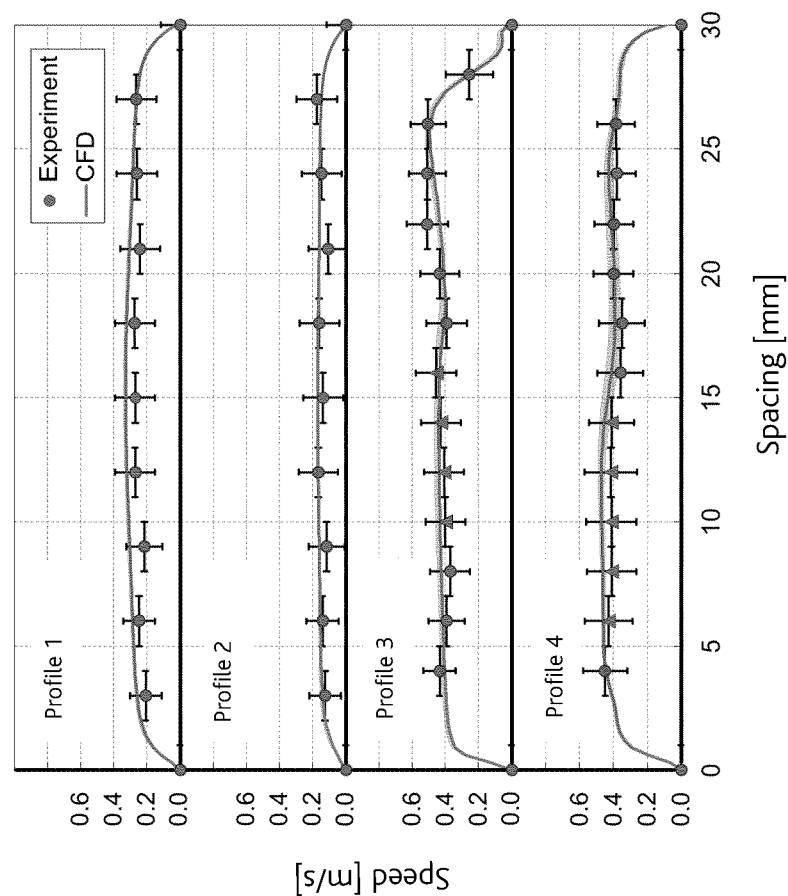
FIG. 10 shows speed profiles measured and simulated on different cross sections.

FIG. 10 shows the measured and simulated speed profiles on different cross sections. Vertical bars indicate the fluctuation range of the speed due to the turbulence, i.e. the average speed fluctuation based on the turbulent kinetic energy, and horizontal bars indicate the error resulting from the tolerance in positioning the laser focal point in the flow channel. In profile 3 and 4, a few invalid measuring points (triangles) were replaced with measuring points of another experiment under the same conditions. The continuous line corresponds to the results of the CFD.

According to speed profiles 1 and 2, the average mass flow for the water inlet amounts to 0.07 kg/s and the average mass flow for the alcohol inlet amounts to 0.04 kg/s, wherein this corresponds well to the values obtained from the results. FIG. 10 shows the measurement results in comparison with the results of the CFD simulation. These results correspond within the expected measuring accuracy as can be gathered, for example, from the speed maximum near the wall in profile 3.

Raman Measurements

The concentration data of the Raman measurement were only recorded in profiles 3 and 4 because only these profiles were located in the mixed zone and a concentration gradient was therefore expected. The points in FIG. 11 shows the experimental data (time-averaged concentration information), wherein the horizontal bars indicate the error resulting from the tolerance in positioning the laser focal point and the vertical bars indicate the concentration fluctuation as a function of the time.

Figure 11:
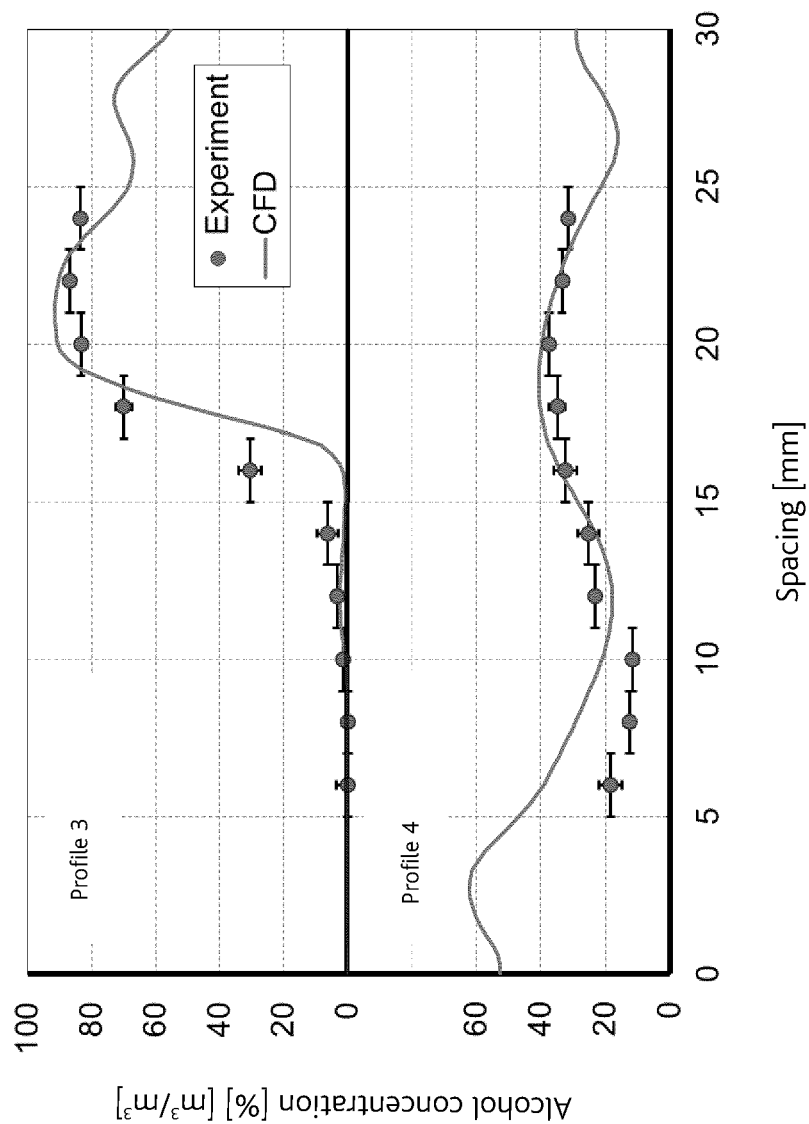
FIG. 11 shows concentration profiles measured and simulated on different cross sections.

According to FIG. 11, the experimental data corresponds quite well to the simulation results. The position of the ethanol concentration change, as well as the maximum concentration, is indicated well in profile 3. Profile 4 also shows an acceptable correspondence of the maxima and minima, as well as over the general concentration profile.

Summary

A new method for the simultaneous measurement of speed and concentration data is presented, wherein said method is based on the combination of two established methods, namely laser Doppler anemometry and stand-off Raman spectroscopy. In this case, the laser source for the LDA measurement is used for multiple purposes: the backscattered light of tracer particles in the fluid flow is evaluated in order to determine the speed and the turbulent speed fluctuations. In addition, Raman spectrums are simultaneously collected in the focal point of the LDA measurement. Synchronizations in space and time are realized by means of a traversing system that moves the optical structure for recording profiles in the flow-through geometry. In addition to the measurements, CFD simulations of the flow channel were also carried out in order to compare the experimental results to validate the measurement structure. It was determined that the experiment corresponds well to the simulation, which in turn confirms the technical applicability.

The inventive combination of LDA or LDV measurements and Raman measurements, in which a single light source is used, therefore allows simultaneous speed measurements and concentration measurements at the same location within the flow to be analyzed with a single light source—and in preferred embodiments also with a single optical lens system both for the irradiation and the detection—which in turn creates synergistic effects of this inventive combination.

The invention claimed is:

1. A method for the contactless determination of both the speed of a liquid flow and the concentration of at least one analyte therein, wherein:
   a) the flow speed is measured by means of laser Doppler anemometry, LDA, using tracer particles, which pass an interference strip pattern in the intersecting region (3) of two coherent monochromatic light beams and thereby generate a scattered light signal, the frequency of which is proportional to the speed component of the flow extending perpendicular to the interference strips; and
   b) the concentration of the at least one analyte is measured by means of Raman spectroscopy in that a monochromatic light beam is irradiated and the Raman spectrum of the light inelastically scattered on analyte molecules in the flow is recorded, wherein the light intensity of frequencies, which only occur in the scattered light, is proportional to the concentration of the analyte molecules in the flow; wherein
   c) a single light source is used for both the LDA and the Raman spectroscopy such that both measurements are carried out in the intersecting region of the two coherent light beams originating from the light source, and wherein the speed is measured by means of photons that are elastically scattered on the tracer particles and the concentration is measured by means of photons that are inelastically scattered on analyte molecules; and
   d) the elastically back-scattered photons are detected by light passing back through a same optical lens system, which is also used for the irradiation of the light beams, for the speed measurement.

2. The method according to claim 1, wherein the inelastically scattered photons for the concentration measurement are detected by means of the same optical lens system, which is also used for the irradiation of the light beams.

3. The method according to claim 1, wherein the inelastically scattered photons for the concentration measurement are detected by means of an optical lens system, which is positioned at a 90° angle to the irradiating direction.

4. The method according to claim 3, wherein the lens of a CCD camera is used as the optical lens system for the concentration measurement.

5. The method according to claim 4, wherein the CCD camera is connected to a spectrograph, which generates the corresponding spectrum from the detected scattered light signal, wherein said spectrum is optionally forwarded to an iCCD camera.

6. The method according to claim 1, wherein the light beams emitted from the light source into the flow are frequency-shifted during the measurement by means of a Bragg cell in order to generate a moving interference pattern in the intersecting region, based on which interference pattern the flow direction is determined.

7. The method according to claim 1, wherein a polychromatic light source is used, the light of which is split into more than one pair of coherent light beams with different wavelengths that are focused on the same point in order to generate the interference pattern.

8. The method according to claim 1, wherein the intersecting region of the light beams is spatially shifted by using a traversing unit, and in that measurements are carried out at several different measuring points.

9. The method according to claim 1, characterized in that the signals detected during LDA and Raman spectroscopy are synchronized in time.

* * * * *